US012718413B2

(12) United States Patent
Wan et al.

(10) Patent No.: US 12,718,413 B2
(45) Date of Patent: Aug. 25, 2026

(54) NEAREST NEIGHBOUR SEARCH METHOD, ENCODER, DECODER AND STORAGE MEDIUM

(71) Applicant: GUANGDONG OPPO MOBILE TELECOMMUNICATIONS CORP., LTD., Dongguan (CN)

(72) Inventors: Shuai Wan, Dongguan (CN); Fuzheng Yang, Dongguan (CN); Lihui Yang, Dongguan (CN); Zexing Sun, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 754 days.

(21) Appl. No.: 18/050,867

(22) Filed: Oct. 28, 2022

(65) Prior Publication Data

US 2023/0101072 A1 Mar. 30, 2023

Related U.S. Application Data

(63) Continuation of application No. PCT/CN2021/083102, filed on Mar. 25, 2021.

(30) Foreign Application Priority Data

Apr. 30, 2020 (CN) ......................... 202010366795.3

(51) Int. Cl.
*G06T 9/00* (2006.01)
*G06T 7/73* (2017.01)

(52) U.S. Cl.
CPC ................ *G06T 9/001* (2013.01); *G06T 7/75* (2017.01)

(58) Field of Classification Search
None
See application file for complete search history.

(56) References Cited

U.S. PATENT DOCUMENTS 11,601,488 B2 * 3/2023 Hur ......................... H04L 65/70
12,200,231 B2 * 1/2025 Yang .................... H04N 19/197
(Continued)

FOREIGN PATENT DOCUMENTS

CN 103136535 A 6/2013
CN 109889840 A 6/2019
(Continued)

OTHER PUBLICATIONS

International Search Report in the international application No. PCT/CN2021/083102, mailed on Jun. 16, 2021. 6 pages with English translation.

(Continued)

*Primary Examiner* — Tyler W. Sullivan
(74) *Attorney, Agent, or Firm* — ASHURST PERKINS COIE US LLP

(57) ABSTRACT

Nearest neighbour search methods, an encoder, and a decoder are provided. In the method, position information of point cloud data to be searched is acquired; slicing is performed on the point cloud data according to the position information and a distance threshold to obtain current-layer data; a corresponding parent node is obtained according to the current-layer data in the point cloud data and a preset number of bits by which position information bits of prediction data corresponding to the current-layer data in the point cloud data are shifted right; a neighbour area in the first-parent node is determined, a nearest neighbour point of the current-layer data in the neighbour area is determined, (Continued)

and searching is performed in a preset search range corresponding to the search point to determine the nearest neighbour point.

8 Claims, 11 Drawing Sheets

(56) References Cited

U.S. PATENT DOCUMENTS

| | | | | |
|---|---|---|---|---|
| 2019/0080483 | A1* | 3/2019 | Mammou | G06T 3/4007 |
| 2020/0021856 | A1* | 1/2020 | Tourapis | H04N 19/13 |
| 2020/0027248 | A1 | 1/2020 | Verschaeve et al. | |
| 2021/0103780 | A1* | 4/2021 | Mammou | G06T 9/004 |
| 2021/0105504 | A1* | 4/2021 | Hur | H04N 19/597 |
| 2022/0343548 | A1* | 10/2022 | Park | H04N 21/4402 |
| 2025/0030900 | A1* | 1/2025 | Hur | H04N 19/91 |

FOREIGN PATENT DOCUMENTS

| | | | |
|---|---|---|---|
| CN | 110572655 | A | 12/2019 |
| CN | 110580250 | A | 12/2019 |
| TW | 201933866 | A | 8/2019 |
| WO | 2013128265 | A2 | 9/2013 |

OTHER PUBLICATIONS

Written Opinion of the International Search Authority in the international application No. PCT/CN2021/083102, mailed on Jun. 16, 2021. 6 pages with English translation.

Notice of Allowance of the Taiwanese application No. 110109403, issued on Apr. 29, 2024. 5 pages with English translation.

* cited by examiner

NEAREST NEIGHBOUR SEARCH METHOD, ENCODER, DECODER AND STORAGE MEDIUM

CROSS-REFERENCE TO RELATED APPLICATION

The present application is a US continuation application of International Application No. PCT/CN2021/083102 filed on Mar. 25, 2021, which is proposed based on Chinese patent application No. 202010366795.3, filed on Apr. 30, 2020, and claims priority to the Chinese patent application. The disclosures of the above applications are hereby incorporated by reference in their entirety.

BACKGROUND

In the related art, after the Level of Detail (LOD) of point cloud attribute is partitioned, each time a layer of LOD is partitioned, the search for nearest neighbour points is performed on the current LOD layer. The search method is as follows. For a set arranged in an ascending order according to Morton codes, the point corresponding to the first Morton code that is larger than the Morton code of the current point is searched, and then search is performed around the index corresponding to the point, then the distance between each point and the current point is calculated, so as to obtain three nearest neighbour points.

However, the Morton code cannot reflect the spatial distance of two points well, and Morton code has periodic jump points, and the neighbour of Morton codes does not guarantee that the spatial positions are close. Therefore, it is inaccurate to find the nearest neighbour points of the first point around the Morton code of the first point, and the performance and efficiency are may change a lot according to different sizes of the search range, and thus adaptive search of the nearest points cannot be achieved, thereby resulting in low search accuracy.

SUMMARY

The present disclosure relates to the field of video encoding, and relates to, but is not limited to, a nearest neighbour search method, encoder, decoder and storage medium.

The embodiments of the present disclosure provide a nearest neighbour search method, an encoder, a decoder, and a storage medium, which can improve the accuracy and success rate of the search.

The technical solutions of the present disclosure are implemented as follows.

The embodiments of the present disclosure provide a nearest neighbour search method. The method is applied to an encoder. The method includes the following operations.

A Morton code set of point cloud data to be searched is acquired.

Slicing is performed on the point cloud data according to the Morton code set and a first distance threshold to obtain current layer data.

Morton code bits of prediction data corresponding to the current layer data in the point cloud data are shifted to right by a first preset number of bits to obtain a corresponding first parent node set.

A neighbour area in the first parent node set is determined according to a Morton code of the current layer data. A nearest neighbour point set of the current layer data is determined in the neighbour area.

In response to the neighbour area being not determined, a search point of the current layer data is determined according to a second node set. Search is performed in a first preset search range corresponding to the search point to determine the nearest neighbour point set. The second node set is a prediction data set corresponding to the current layer data in the point cloud data.

The embodiments of the present disclosure provide a nearest neighbour search method. The method is applied to a decoder. The method includes the following operations.

A Morton code set of point cloud data to be searched is acquired.

Slicing is performed on the point cloud data according to the Morton code set and a first distance threshold to obtain current layer data.

Morton code bits of prediction data corresponding to the current layer data in the point cloud data are shifted to right by a first preset number of bits to obtain a corresponding first parent node set.

A neighbour area in the first parent node set is determined according to a Morton code of the current layer data. A nearest neighbour point set of the current layer data is determined in the neighbour area.

In response to the neighbour area being not determined, a search point of the current layer data is determined according to a second node set. Search is performed in a first preset search range corresponding to the search point to determine the nearest neighbour point set. The second node set is a prediction data set corresponding to the current layer data in the point cloud data.

The embodiments of the present disclosure provide an encoder. The encoder includes a first acquiring unit, a first slicing unit, a first shifting unit, and a first determining unit.

The first acquiring unit is configured to acquire a Morton code set of point cloud data to be searched.

The first slicing unit is configured to perform slicing on the point cloud data according to the Morton code set and a first distance threshold to obtain current layer data.

The first shifting unit is configured to shift Morton code bits of prediction data corresponding to the current layer data in the point cloud data to right by a first preset number of bits to obtain a corresponding first parent node set.

The first determining unit is configured to determine, according to a Morton code of the current layer data, a neighbour area in the first parent node set, determine a nearest neighbour point set of the current layer data in the neighbour area, and in response to the neighbour area being not determined, determine a search point of the current layer data according to a second node set, and perform search in a first preset search range corresponding to the search point to determine the nearest neighbour point set. The second node set is a prediction data set corresponding to the current layer data in the point cloud data.

The embodiments of the present disclosure provide a decoder. The decoder includes a second acquiring unit, a second slicing unit, a second shifting unit, and a second determining unit.

The second acquiring unit is configured to acquire a Morton code set of point cloud data to be searched.

The second slicing unit is configured to perform slicing on the point cloud data according to the Morton code set and a first distance threshold to obtain current layer data.

The second shifting unit is configured to shift Morton code bits of prediction data corresponding to the current layer data in the point cloud data to right by a first preset number of bits to obtain a corresponding first parent node set.

The second determining unit is configured to determine, according to a Morton code of the current layer data, a neighbour area in the first parent node set, determine a nearest neighbour point set of the current layer data in the neighbour area, and in response to the neighbour area being not determined, determine a search point of the current layer data according to a second node set, and perform search in a first preset search range corresponding to the search point to determine the nearest neighbour point set. The second node set is a prediction data set corresponding to the current layer data in the point cloud data.

The embodiments of the present disclosure provide an encoder. The encoder includes a first memory and a first processor.

The first memory is configured to store a computer program executable on the first processor.

The first processor is configured to perform the nearest neighbour search method on the encoder side when running the computer program.

The embodiments of the present disclosure provide a decoder. The decoder includes a second memory and a second processor.

The second memory is configured to store a computer program executable on the second processor.

The second processor is configured to: perform the nearest neighbour search method on the decoder side when running the computer program.

The embodiments of the present disclosure provide computer-readable storage medium storing a computer program thereon. When the computer program is executed by a first processor, the nearest neighbour search method on the encoder side is implemented. When the computer program is executed by a second processor, the nearest neighbour search method on the decoder side is implemented.

DETAILED DESCRIPTION

The technical solutions in the exemplary embodiments of the present disclosure will be clearly and completely described below with reference to the accompanying drawings in the exemplary embodiments of the present disclosure.

An exemplary embodiment of the present disclosure proposes a nearest neighbour search method. The method is applied to a mobile device with a front-facing camera function or a rear-facing camera function. The mobile device can be implemented in various forms. For example, the mobile device described in an exemplary embodiment of the present disclosure may include a mobile phone, a tablet computer, a palmtop computer, a Personal Digital Assistant (PDA), and the like. In addition, the functions implemented by the method can be implemented by the processor in the mobile device calling program codes. Of course, the program codes can be stored in a computer storage medium. It can be seen that the mobile device at least includes a processor and a storage medium. In the point cloud G-PCC encoder framework, each slice is independently encoded after performing slice partitioning on the point cloud of the input three-dimensional image model.

Figure 1:
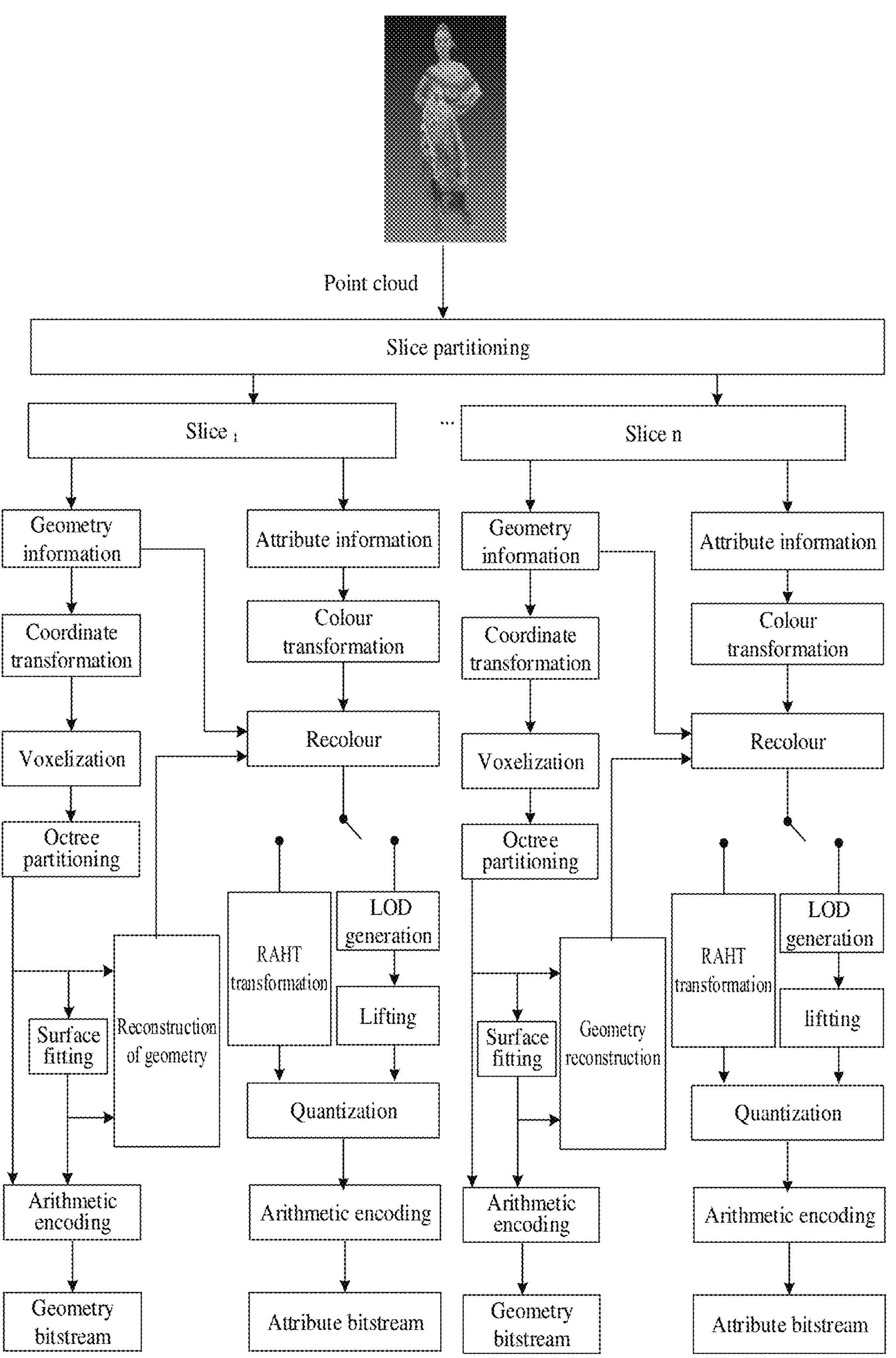
FIG. 1 is a flow diagram of Geometry-based Point Cloud Compression (G-PCC) encoding provided by an exemplary embodiment of the present disclosure.

Referring to FIG. 1, a flow diagram of G-PCC encoding provided by the related technical solutions is shown. In the flow diagram of G-PCC encoding shown in FIG. 1, the method is applied to a point cloud Encoder. For the point cloud data to be encoded, the point cloud data is first partitioned into multiple slices by slice partitioning. In each slice, the geometry information of the point cloud and the attribute information corresponding to each point cloud are encoded separately. In the geometry encoding process, coordinate transformation is performed on the geometry information firstly, so that the point clouds are all contained in a bounding box, and then quantization is performed. The step of quantization mainly plays the role of scaling. Due to the rounding of quantization, the geometry information of a part of the point clouds is the same, so whether to remove the duplicate points is determined based on the parameters, and the process of quantizing and removing the duplicate points is also called the voxelization process. Then octree partitioning is performed on the bounding box. In the octree-based geometry information encoding process, the bounding box is partitioned into eight sub-cubes equally, and then the non-empty sub-cubes (including points in the point cloud) are partitioned into eight equal parts. The partitioning is stopped until the leaf nodes obtained by partition are $1\times1\times1$ unit cubes. Arithmetic encoding is performed on the points in the leaf nodes to generate a binary geometry bitstream, i.e., a geometry bitstream. In the geometry information encoding process based on triangle soup (trisoup), octree partitioning is also required to be performed firstly. Different from the octree-based geometry information encoding, the trisoup does not need to partition the point cloud level by level to a $1\times1\times1$ cube, but the partitioning is stopped when the side length of a block (sub-block) is W. At most twelve vertices generated by a surface and twelve edges of block are obtained based on the surface formed by the distribution of point clouds in each block. Arithmetic encoding (surface fitting based on the vertices) is performed on the vertices, and a binary geometry bitstream is generated, i.e., a geometry bitstream. Vertex is also used in the implementation of the geometry reconstruction process, and the reconstructed set information is used when encoding the attribute of the point cloud.

After the geometry encoding is completed, reconstruction is performed on the geometry information. At present, attribute encoding is mainly performed for colour information. In the attribute encoding process, the colour information (i.e., attribute information) is first converted from the RGB colour space to the YUV colour space. Then, the point cloud is recoloured by using the reconstructed geometry information, so that the unencoded attribute information corresponds to the reconstructed geometry information. In the colour information encoding process, there are mainly two transformation methods. The first method is the distance-based lifting transformation that depends on the Level of Detail (LOD) partitioning. At present, there are mainly two methods for LOD partitioning: LOD partitioning based on distance (mainly for Category1 sequence) and LOD partitioning based on a fixed sampling rate (mainly for Category3 sequence). The second method is to directly perform the transformation of Region Adaptive Hierarchal Transform (RAHT). These two methods will both convert the colour information from the spatial domain to the frequency domain, a high-frequency coefficient and a low-frequency coefficient are obtained through transformation, and finally the coefficients are quantified (i.e., quantifying coefficient). Finally, after performing slice combination on geometry encoding data subjected to octree partitioning and surface fitting and the attribute encoding data processed by quantifying coefficient, the vertex coordinate of each block is encoded in turn (i.e., arithmetic encoding), and a binary attribute bitstream, that is, an attribute bitstream, is generated.

Figure 2:
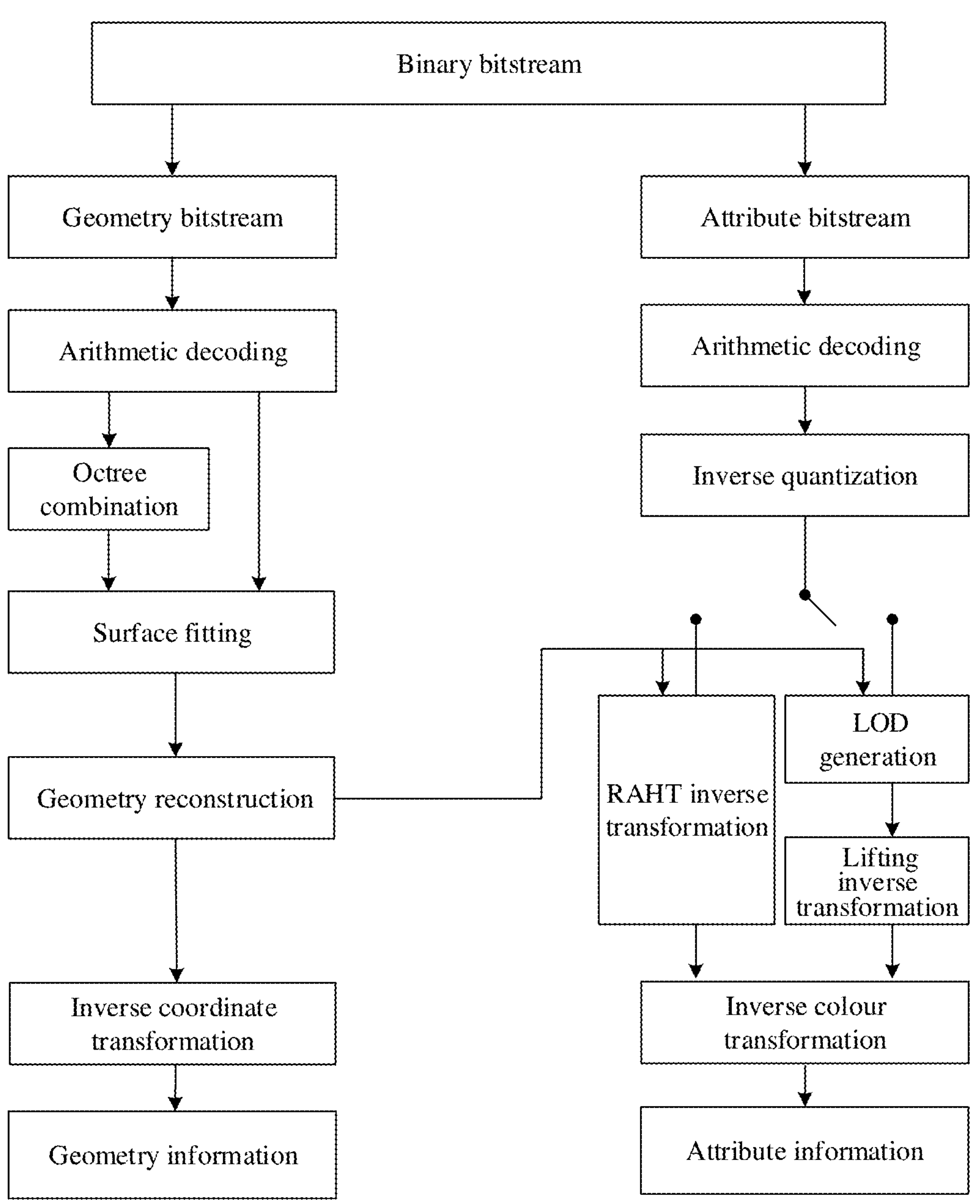
FIG. 2 is a flow diagram of G-PCC decoding provided by an exemplary embodiment of the present disclosure.

Referring to FIG. 2, a flow diagram of G-PCC decoding provided by the related technical solutions. In the flow diagram of G-PCC decoding shown in FIG. 2, the method is applied to the point cloud Decoder. For the acquired binary bitstream, decoding is independently performed on geometry bitstream and attribute bitstream in the binary bitstream firstly. When decoding the geometry bitstream, the geometry information of the point cloud is obtained through arithmetic decoding-octree combination-surface fitting-reconstruction geometry-inverse coordinate transformation. When decoding the attribute bitstream, the attribute information of the point cloud is obtained through arithmetic decoding-inverse quantization—the LOD-based lifting inverse transformation or the RAHT-based inverse transformation-inverse colour transform, and the three-dimensional image model of the point cloud data to be encoded is restored based on the geometry information and attribute information.

In a related technical solution, a solution for LOD partitioning based on Morton code is proposed. Compared with the original solution for LOD partitioning by traversal and search of all points, the solution for LOD partitioning based on Morton code can reduce the computational complexity.

Specifically, Morton encoding is also called z-order code because its encoding order is z order in spatial. First, the point in the input point cloud is represented by a variable $P_i$, and the variable M is the Morton code associated with $P_i$. Here, i=1, 2, . . . , N. The specific process of calculating the Morton code is described as follows. For a three-dimensional coordinate, represented by a d-bit binary value, of each component, the three coordinate components are represented as follows:

$$x=\sum_{l=1}^{d}2^{d-l}x_l,\ y=\sum_{l=1}^{d}2^{d-l}y_l,\ z=\sum_{l=1}^{d}2^{d-l}z_l$$

Here, $x_l, y_l, z_l \in \{0,1\}$ are the binary values corresponding to the highest bit (l=1) to the lowest bit (l=d) of x, y, and z, respectively. The Morton code M is obtained by starting from the highest bit of x, y, and z, and cross-arranging $x_l$, $y_l$, $z_l$ to the lowest bit. The calculation formula of M is as follows:

$$M=\sum_{l=1}^{d}2^{3(d-l)}(4x_l+2y_l+z_l)=\sum_{l'=1}^{3d}2^{3d-l'}m_{l'} \tag{1}$$

Here, $m_{l'} \in \{0,1\}$ are the values of M from the highest bit (l'=1) to the lowest bit (l'=3d), respectively. After obtaining the Morton code M of each point in the point cloud, the points in the point cloud are arranged in the order of Morton codes from less to great.

The embodiments of the present disclosure provide a nearest neighbour search method. The method is applied to an encoder (which can also be a point cloud encoder) or a decoder (a point cloud decoder).

The embodiments of the present disclosure will be described in detail below with reference to the accompanying drawings.

Figure 3A:
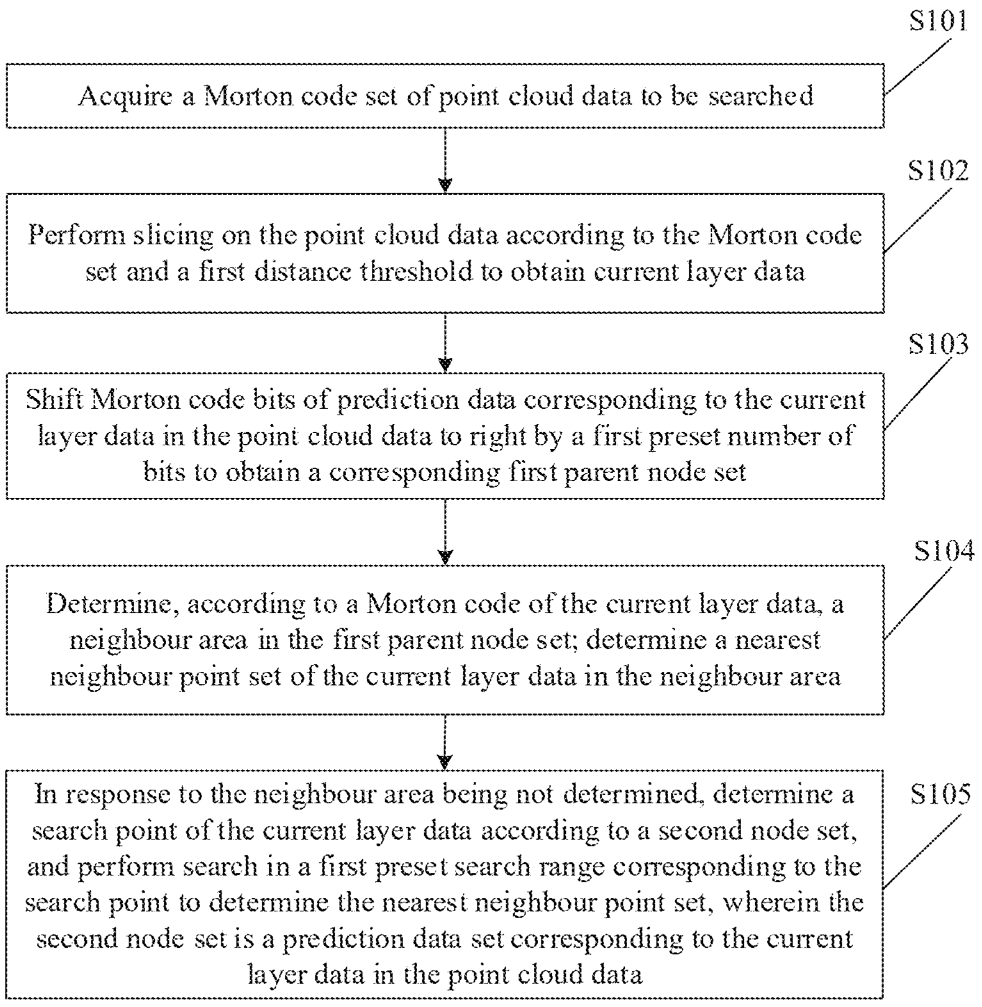
FIG. 3A is a schematic flowchart of a nearest neighbour search method provided by an exemplary embodiment of the present disclosure.

Referring to FIG. 3, a schematic flowchart of a partitioning method provided by the embodiments of the present disclosure is shown. As shown in FIG. 3, the method applied to an encoder or a decoder includes the following operations.

In operation S101, a Morton code set of point cloud data to be searched is acquired.

It should be noted that, in the point cloud, the point cloud data may be all points in the point cloud, or part points in the point cloud, and these points are relatively concentrated in space.

It should also be noted that the embodiments of the present disclosure are aimed at improving the LOD generation process in the lifting and Predicting attribute transformation. That is, before performing the lifting and Predicting transformation, the partitioning method is needed to be used for performing partitioning of LOD layer. Specifically, the partitioning method may be applied to the LOD generation part in the flow diagram of G-PCC encoding shown in FIG. 1, or may also be applied to the LOD generation part in the flow diagram of G-PCC decoding shown in FIG. 2, or may also be applied to the LOD generation part in the flow diagram of G-PCC encoding shown in FIG. 1 and the LOD generation part in the flow diagram of G-PCC decoding shown in FIG. 2 at the same time, which is not specifically limited in the embodiments of the present disclosure.

In the embodiments of the present disclosure, the point cloud data to be searched may be understood as point cloud data that needs to determine the nearest neighbour point. For example, in the process of compressing and encoding the point cloud data, the Morton code set of the point cloud data is determined firstly. In some possible implementations, point cloud data to be searched is acquired firstly, for example, point cloud data used to form a three-dimensional video, etc. Then, the Morton code of the point cloud data is determined. For example, the binary encoded data stream of the point cloud data may be determined firstly, and then the Morton code of the point cloud data may be determined based on the binary encoded data stream. Finally, the Morton codes of the point cloud data are arranged in ascending order to obtain the Morton code set including a plurality of Morton codes. In other embodiments, the Morton codes of the point cloud data may also be arranged in descending order to obtain the Morton code set including a plurality of Morton codes. The Morton codes of the point cloud data also may be arranged in any specific order (for example, an arbitrarily set order, the middle is the largest, and the two ends are successively decreased, etc.) to obtain the Morton code set. That is, the arrangement of Morton codes in the Morton code set is ordered.

In this way, after the point cloud data to be searched is acquired, the Morton codes of the points in the point cloud data to be searched is firstly calculated to obtain a Morton code set, so that in subsequent iterative operations, the Morton codes may be used to search the neighbour node of the parent node corresponding to current node, so it is beneficial to use the current node as a sampling point to predict the neighbour node when the LOD layer partitioning is performed.

In operation S102, slicing is performed on the point cloud data according to the Morton code set and a first distance threshold to obtain current layer data.

Here, a point whose distance to the current point is less than the first distance threshold is selected from the Morton code set according to the first distance threshold, to obtain the current layer data. Each time a layer of data is partitioned, the first distance threshold gradually increases. That is, the first distance threshold used when partitioning the next layer data of the current layer data is greater than the first distance threshold used by the current layer data. That is, the density of the next layer data of the current layer data is smaller than the density of the current layer data.

In some possible implementations, a second set at least including a point corresponding to a first Morton code is determined according to the Morton code set.

For example, the point corresponding to the first Morton code in the Morton code set arranged in ascending order is taken as the point in the second set.

Further, if a distance between a currently processed current point in the point cloud data and a point in the second set is less than or equal to the first distance threshold, the current point is placed into a first set.

It should be noted that the first set is initialized as an empty set initially. If the distance between a currently processed current point in the point cloud data and a point in the second set is less than or equal to the first distance threshold, the current point is placed into the first set. That is, the initial first set is an empty set.

For example, the points closer to the current point are determined from the Morton code set. That is, the density of the obtained points in the first set is larger. The distances between the point corresponding to the second Morton code arranged in the Morton code set and all points in the second set are determined. If any distance is less than or equal to the first distance threshold, the current point is placed into the first set.

Further again, if the distance between the current point and the point in the second set is greater than the first distance threshold, the current point is placed into the second set.

In a specific example, points are traversed according to the Morton code order. For the current point P being traversed, it is determined whether the distances between P and the points in the second set O(k) are less than or equal to the first distance threshold. If the distances are less than or equal to the first distance threshold, P is placed into the first set L(k), otherwise, P is placed into O(k). When determining the distances between P and points in O(k), if the points in O(k) are more than 128, it is only needed to judge whether the distances between the last 128 points in O(k) and the point P are greater than the first distance threshold to determine whether the point P is placed in the first set or the second set. In this way, whether the current point should be placed in the first set or the second set is determined by determining the distances between a preset number of points arranged late in the second set and the current point, so that the complexity can be reduced. Since the Morton codes of the points arranged late in the second set are closer to the Morton code of the current point, the obtained final neighbour area is more likely to contain the nearest neighbour point.

Finally, a point in the second set whose distance from the current point being less than or equal to a second distance threshold is determined to obtain the current layer data.

In some possible implementations, the second set may contain a plurality of points, and the points whose distances between the current point in the point cloud data and the points in the second set are less than the first distance threshold are taken as the first layer data. Then, the distances between the remaining points in the point cloud data and the points in the updated second set are traversed in turn, the points whose distance are less than the second distance threshold are taken as the second layer data, and the second set updated again is obtained. The distances between the remaining points in the point cloud data and the points in the second set updated again are traversed in turn, the points whose distance are less than another distance threshold (the another distance threshold is greater than the second distance threshold) are taken as the third layer data and so on, until the point cloud data is partitioned into multi-layer data.

In operation S103, Morton code bits of prediction data corresponding to the current layer data in the point cloud data are shifted to right by a first preset number of bits to obtain a corresponding first parent node set.

Here, the operation of shifting the Morton code bits of the prediction data corresponding to the current layer data in the point cloud data to the right by the first preset number of bits may be understood as expanding the range corresponding to the Morton code of the prediction data by multiple times.

It should be noted that the first preset number of bits is a preset non-negative integer. The first preset number of bits includes 0, i.e., the case of no shift. For example, when the current layer is the first layer, the first preset number of bits may be 0, which is not limited in the embodiments of the present disclosure.

Exemplarily, the first preset number of bits is 3, i.e., the range is expanded $2^3$ times, which is not limited in the embodiments of the present disclosure. Therefore, the first parent node set is the right-shifted Morton code set of the prediction data.

At this time, the second node set is the corresponding prediction data set in the current layer data in the point cloud data. The prediction data is the prediction point corresponding to the current layer data, and the current layer data is the predicted point.

In some embodiments of the present disclosure, if the current layer is not the first layer, the first parent node set is obtained through the first preset number of bits. The point of the previous layer data is the prediction data except for the sliced data in the point cloud data, and the prediction data is preset. For example, 3, which is not limited in the embodiments of the present disclosure.

In the embodiments of the present disclosure, when the encoder encodes, the encoder needs to signal the first preset number of bits in the bitstream. Here, the first preset number of bits is a preset non-negative integer.

Here, the first preset number of bits may be signalled in a parameter set data unit in the bitstream.

In the decoding process of the decoder, when parsing the bitstream to obtain the first preset number of bits, the parameter set data unit in the bitstream needs to be parsed firstly to obtain the first preset number of bits. The first preset number of bits is a non-negative integer.

In the embodiments of the present disclosure, the parameter set data unit includes parameters used for decoding part or all of the data units in the bitstream.

In the embodiments of the present disclosure, the parameter set data unit is a Sequence Parameter Set data unit.

In the embodiments of the present disclosure, the parameter set data unit includes attribute information of the point cloud data. The attribute information is scalar or vector attribute information associated with points in the point cloud data. That is, the parameter set data unit may be an Attribute parameter set.

In the embodiments of the present disclosure, the parameter set data unit includes geometry information of point cloud data. The geometry information is Cartesian coordinates associated with points in the point cloud data. That is, the parameter set data unit may be a Geometry parameter set.

In some embodiments of the present disclosure, the process of acquiring the first preset number of bits may further include the following operations. Sampling is performed on the Morton code set according to a preset interval to obtain a sample set. The Morton code set includes all or part of Morton codes of the prediction data. Morton code bits of points in the sample set are shifted to the right by n bits to obtain a sample parent node set. Each sample parent node corresponds to a right-shifted Morton code. Neighbour points other than samples are determined in an area corresponding to the sample parent node set. If an average number of neighbour points in the sample parent node set is greater than a preset average threshold, it is determined that the n bits are a value of the first preset number of bits, and n is a non-negative integer.

The number of samples in the sample set is H. H is a positive integer greater than 0, which is not limited in the embodiments of the present disclosure.

In some embodiments of the present disclosure, sampling is performed on the sorted Morton codes to obtain Morton codes of K samples. K is an integer greater than 0. The Morton codes of K samples are shifted to the right to obtain the K samples corresponding to the right-shifted Morton code. It is judged that whether the K samples corresponding to the right-shifted Morton codes meet that each sample corresponds to at least one neighbour node in average. If the K samples corresponding to the right-shifted Morton codes do not meet that each sample corresponds to at least one neighbour node in average, the step of shifting the Morton codes of the K samples to the right is continued to perform. If the K samples corresponding to the right-shifted Morton codes meet that each sample corresponds to at least one neighbour node in average, the right shift number of bits of K samples is obtained. The right shift number of bits is determined as the initial right shift number of bits of the Morton codes of the points of the point cloud to be partitioned. The initial right shift number of bits represents the right shift number of bits NO corresponding to the 0th LOD layer of the Morton codes of the points of the point cloud to be partitioned.

That is to say, when the LOD layer is initially partitioned, that is, when the 0th LOD layer is partitioned, the Morton codes of K samples are obtained by performing sampling on the sorted Morton codes firstly. Then the Morton codes of K samples are continuously shifted to the right until that the K samples corresponding to the right-shifted Morton codes meet that each sample corresponds to at least one neighbour node in average. Finally, the obtained right shift number of bits is taken as the initial right shift number of bits N0.

Figure 4:
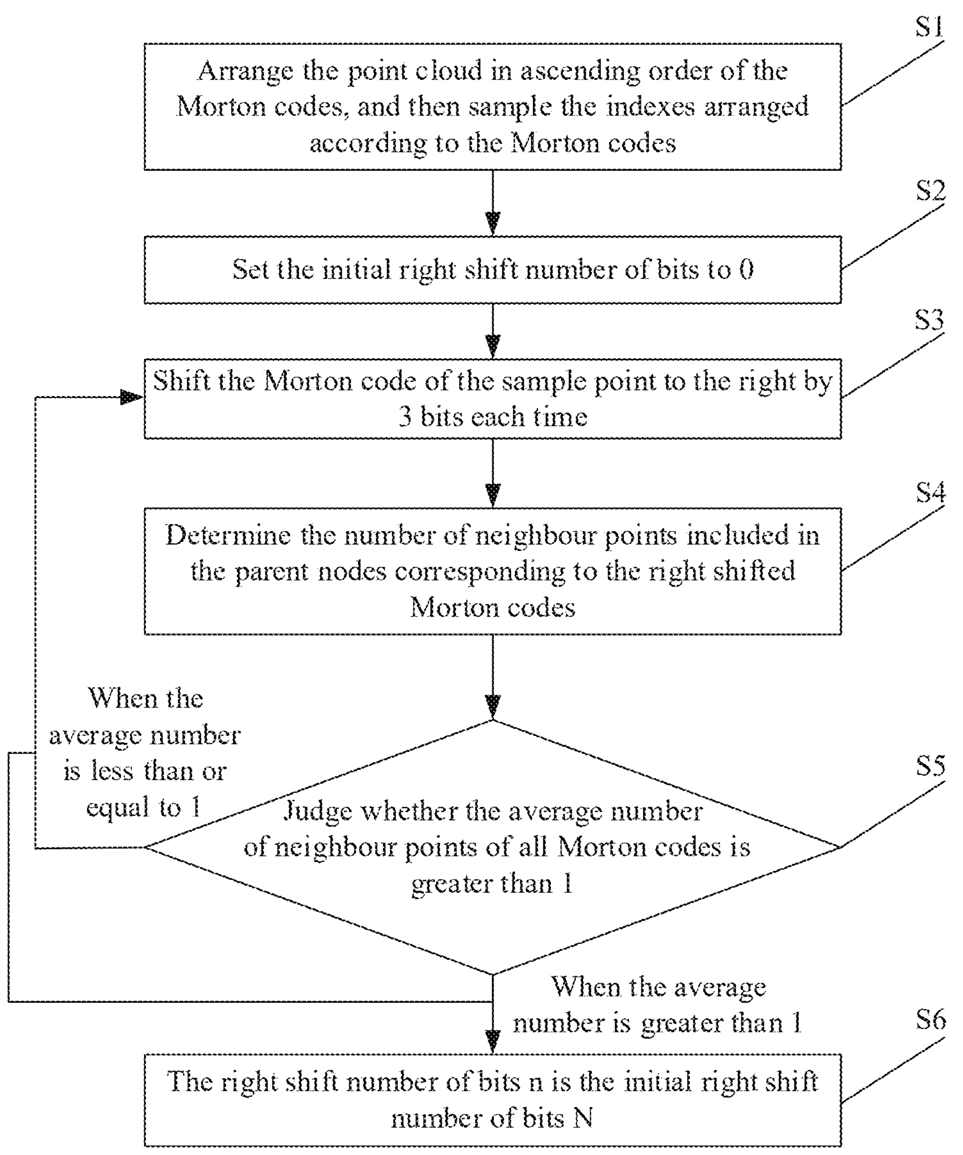
FIG. 4 is a schematic flowchart of determining an initial right shift number of bits provided by an exemplary embodiment of the present disclosure.

Exemplarily, as shown in FIG. 4, the implementation is as follows.

In operation S1, arranging is performed on the point cloud in ascending order of the Morton codes, and then the indexes arranged according to Morton codes are sampled.

For example, it is assumed that when H is 100, 100 points are selected at equal intervals as samples.

In operation S2, the initial right shift number of bits is set to 0.

Here, the initial right shift number of bits n is set to 0.

In operation S3, the Morton code of the sample is shifted to the right by 3 bits each time.

Here, the initial right shift number of bits n=0 is set, and then the Morton code of the sample is shifted to the right by 3 bits when each layer is partitioned.

In operation S4, the number of neighbour points included in the parent nodes corresponding to the right-shifted Morton codes is determined.

In operation S5, whether the average number of neighbour points of all Morton codes is greater than 1 is judged.

Here, for the points in the parent nodes, the remaining points except the current point are regarded as the neighbours of the current point. When the average number is greater than 1, the operation S6 is performed. At this time, the right shift number of bits n is the initial right shift number of bits N, and the cyclic process is ended. When the average number is less than or equal to 1, the operation S3 is returned, and the operation of shifting right by 3 bits is performed.

In operation S6, the right shift number of bits n is the initial right shift number of bits N.

Figure 5:
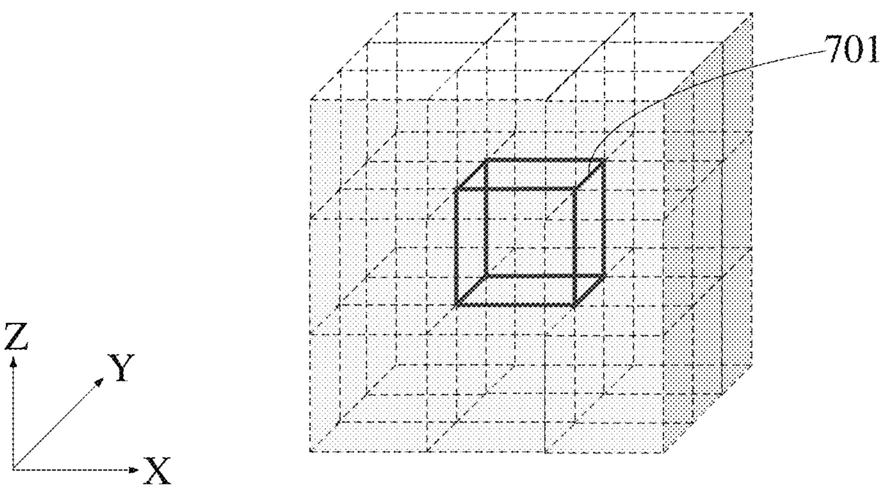
FIG. 5 is a schematic diagram of a spatial relationship between a current node and neighbour nodes provided by an exemplary embodiment of the present disclosure.

After the LOD layer is partitioned, when the nearest neighbour search is performed, for the predicted point P, the Morton code of its parent node can be searched in O(k). As shown in FIG. 5, block 701 is the parent node of the currently predicted point P. For the current parent node, there are 26 adjacent neighbour parent nodes. A lookup table is established through the coordinate difference between the neighbour parent node and the current parent node, and the Morton code of the neighbour parent node is calculated and obtained according to the lookup table. With these Morton codes, the indexes corresponding to these neighbour Morton codes can be found in O(k), thereby finding the nearest neighbour of the predicted point P by traversing the points corresponding to these indexes. In some embodiments, in addition to the 27 neighbour parent nodes that are itself, coplanar, colinear, and co-pointed, the range of neighbour parent nodes may be expanded or reduced. In this way, the number of neighbours may be expanded outward. Similarly, for the selection of neighbours, part of neighbours may also be selected for nearest neighbour search.

In operation S104, a neighbour area in the first parent node set is determined according to a Morton code of the current layer data. A nearest neighbour point set of the current layer data is determined in the neighbour area.

Here, the neighbour area may be understood as the neighbour area near the current parent node. In this way, the neighbour area is searched through the Morton code, and the search range may be narrowed under the premise that the nearest neighbour point in the area can be accurately found.

Here, a nearest neighbour point set is determined for each layer data. The nearest neighbour point set may be the nearest neighbour points that contain specific data amount. The amount of the specific data amount is not limited in the embodiments of the present disclosure.

Exemplarily, the specific data amount includes 3.

In some possible implementations, firstly, the distances between the points in the neighbour area and the points in the current layer data are determined to obtain the distance set. For example, there are M points in the current layer data, and the distances between the M points and the points in the neighbour area are determined to obtain a distance set. Then, a target distance that is less than a third distance threshold is determined from the distance set. In some embodiments, the third distance threshold may be set to a relatively less value, and the third distance threshold is less than the first distance threshold. In a specific example, K target distances with the minimum K distances (K is an integer greater than 0) may be determined from the distance set. Finally, the nearest neighbour point set of the current point is determined according to the point corresponding to the target distance. For example, the points corresponding to the N target distances are taken as the nearest neighbour set of the current point. Optionally, several points with less distance may be determined from the points corresponding to the N target distances as the nearest neighbour point set of the current point. For example, points corresponding to a minimum distance value satisfying a preset number are determined from the points corresponding to the target distance to obtain the nearest neighbour point set of the current point. M is a positive integer greater than 0.

In a specific example, points corresponding to a specific number of minimum distance values are determined from the points corresponding to the target distances to obtain the nearest neighbour point set of the current point. In this way, the nearest neighbour point is accurately found, which improves the encoding performance of point cloud data.

In some embodiments, if the distance set does not include the target distance whose distance is less than the third distance threshold, the points arranged at the preset positions are determined from the second set as the nearest neighbour point set of the current point. For example, the nearest K points arranged before and after the current point are taken as the nearest neighbour point set.

In an exemplary embodiment of the present disclosure, the neighbour area is searched through the Morton code of the current layer data, and the range for searching for the nearest neighbour point is narrowed under the premise that the neighbour area can be accurately found, thereby reducing the times of calculating the distance, and acquiring better encoding performance and efficiency.

In operation S105, if the neighbour area is not determined, a search point of the current layer data is determined according to the second node set, and search is performed in a first preset search range corresponding to the search point to determine the nearest neighbour point set. The second node set is a prediction data set corresponding to the current layer data in the point cloud data.

In the embodiment of the present disclosure, when the nearest neighbour point set of the current layer data is not determined according to the Morton code of the current layer data and the first parent node set, the search point of the current layer data is determined according to the second node set. Search is performed in a first preset search range corresponding to the search point, thereby determining a candidate point set. The K points nearest to the current point are determined from the candidate point set as the nearest neighbour point set. The second node set is a prediction data set corresponding to the current layer data in the point cloud data. K is a positive integer greater than 0.

It should be noted that the second node set is the second set acquired at the current layer.

In some embodiments of the present disclosure, the first Morton code greater than the current Morton code of the current point of the current layer data is determined from the second node set. The point corresponding to the first Morton code is set as the search point.

Exemplarily, DO (the threshold of the initial distance) and p (the distance threshold ratio when the neighbour LOD layers are partitioned) are respectively user-defined initial parameters, and $\rho>1$. It is assumed that I represents the indexes of all points. In the k-th iteration, for the points in LODk, the nearest neighbours, i.e., the points with the nearest distance, will be searched from LOD0 layer to LODk−1 layer, and $k=1, 2, \ldots, N-1$. Here, N is the total number of layers of LOD partitioning. When k=0, in the 0th iteration, for the points in LOD0, the nearest neighbours will be directly searched from LOD0. The specific process is as follows.

(1) The partitioning distance threshold is initialized as $D=D_0$.

(2) In the k-th iteration, the points belonging to the k-th layer LOD are contained in the set L(k), and the point set with a level of refinement higher than that of the LODk layer is contained in the set O(k). The calculation process of L(k) and O(k) is as follows.

Firstly, both O(k) and L(k) are initialized to empty sets.

Secondly, each iteration is traversed according to the index order of the points contained in set I. Specifically, in each traversal, the geometry distances from the current point to all points in a certain range in the set O(k) are calculated. The index of a first point whose the Morton code is greater than the Morton code corresponding to the current point is searched in the set O(k) based on the Morton code corresponding to the current point in set I. Then search is performed within a search range SR1 of the index (here, SR1 represents the search range based on the Morton code, and is generally valued as 8, 16, 64). If in this range, a point whose distance from the current point is less than the threshold $d_l$ is found, the current point is added to the set L(k), otherwise, the current point is added to the set O(k).

(3) In the process of each iteration, the sets L(k) and O(k) are calculated separately, and the points in O(k) are used to predict the points in the set L(k). It is assumed that the set $R(k)=L(k)\setminus L(k-1)$, that is, R(k) represents the point set of the difference part between set LOD (k−1) and set LOD(k). For points in set R(k), the nearest h predicted neighbours will be searched in set O(k). The specific process of searching the nearest neighbour is as follows.

a. For the point Pi in the set R(k), the Morton code corresponding to the point is Mi.

b. The index j of the first point whose the Morton code is greater than the Morton code Mi corresponding to the current point Pi is searched in the set O(k).

c. The nearest neighbours of the current point Pi are searched in a search range [j−searchrange, j+Search range] in the set O(k) based on index j (here, searchrange represents a search range, that is, the first preset search range, and is generally valued as 8, 16, 32, 64).

(4) Iterations are continuously performed by repeating the process of (1) to (3) until all the points in the set I have been traversed, so as to obtain the candidate point set, and K points nearest to the predicted point are found from these candidate point sets to be taken as a nearest neighbour point set. That is, K nearest neighbour points are obtained.

That is to say, in the embodiments of the present disclosure, the indexes of all points are contained in the input point cloud set I, which is taken as the input point cloud of the first LOD partitioning. The algorithm iterates continuously. In the kth iteration, LOD partitioning is performed firstly. That is, the input point cloud set I is partitioned into L(k) and O(k). Then, the nearest neighbour search is performed on points belonging to L(k) in O(k). O(k) is taken as the input point cloud set for the next iteration.

It can be understood that the current layer data is obtained by slicing the Morton codes of the point cloud data. Then, the neighbour area is determined based on the Morton code of the current layer data, and the nearest neighbour point set of the current layer data is determined in the neighbour area. In this way, the neighbour area is searched through the Morton code of the current layer data, and the range for searching the nearest neighbour point is narrowed under the premise that the neighbour area can be accurately found. When the neighbour area is not searched through the Morton code of the current layer data, the neighbour area may also be searched based on the second node set, which improves the success rate of the search.

Figure 3B:
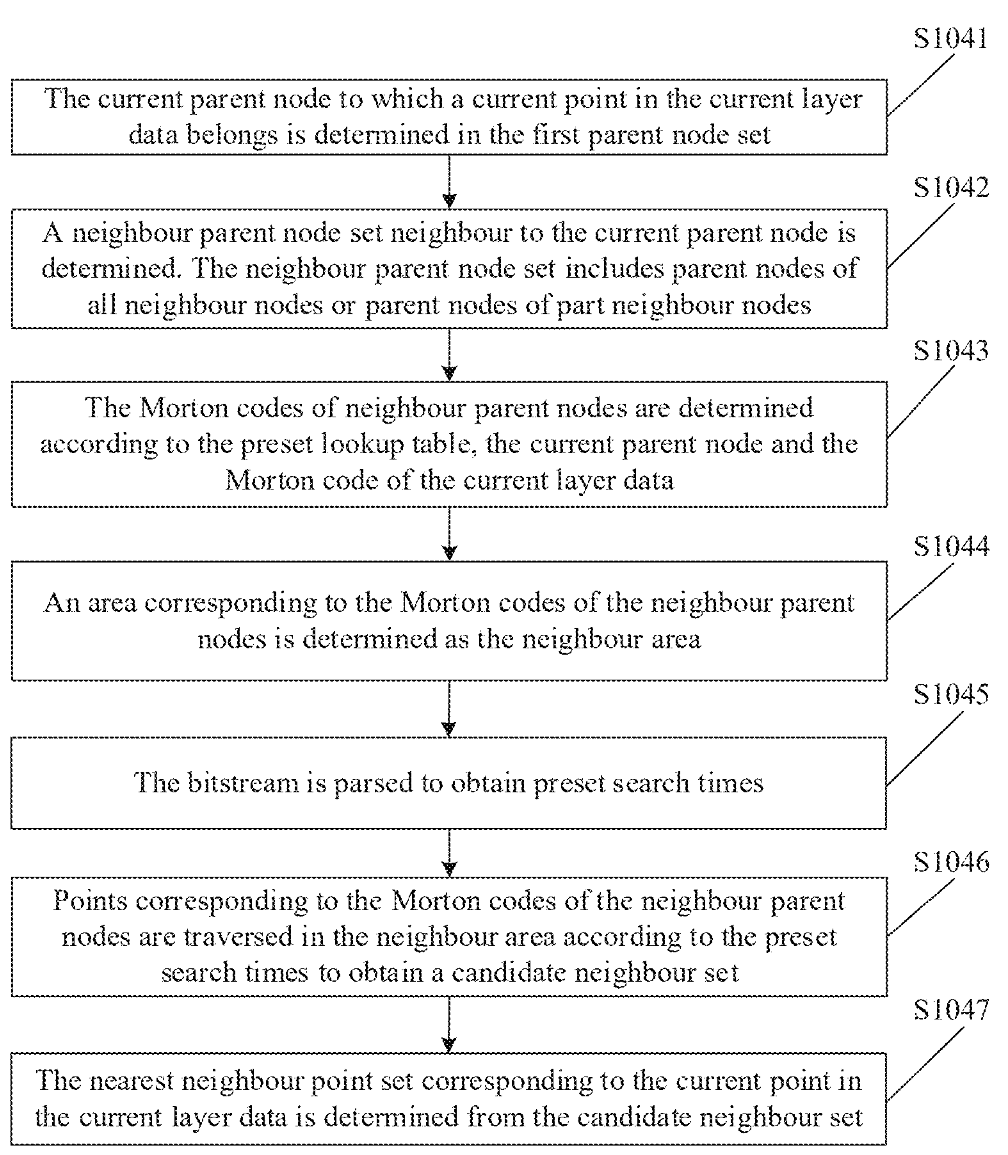
FIG. 3B is a schematic flowchart of a method for determining a nearest neighbour point set of the current layer data performed in decoder side, provided by an exemplary embodiment of the present disclosure.
Figure 3C:
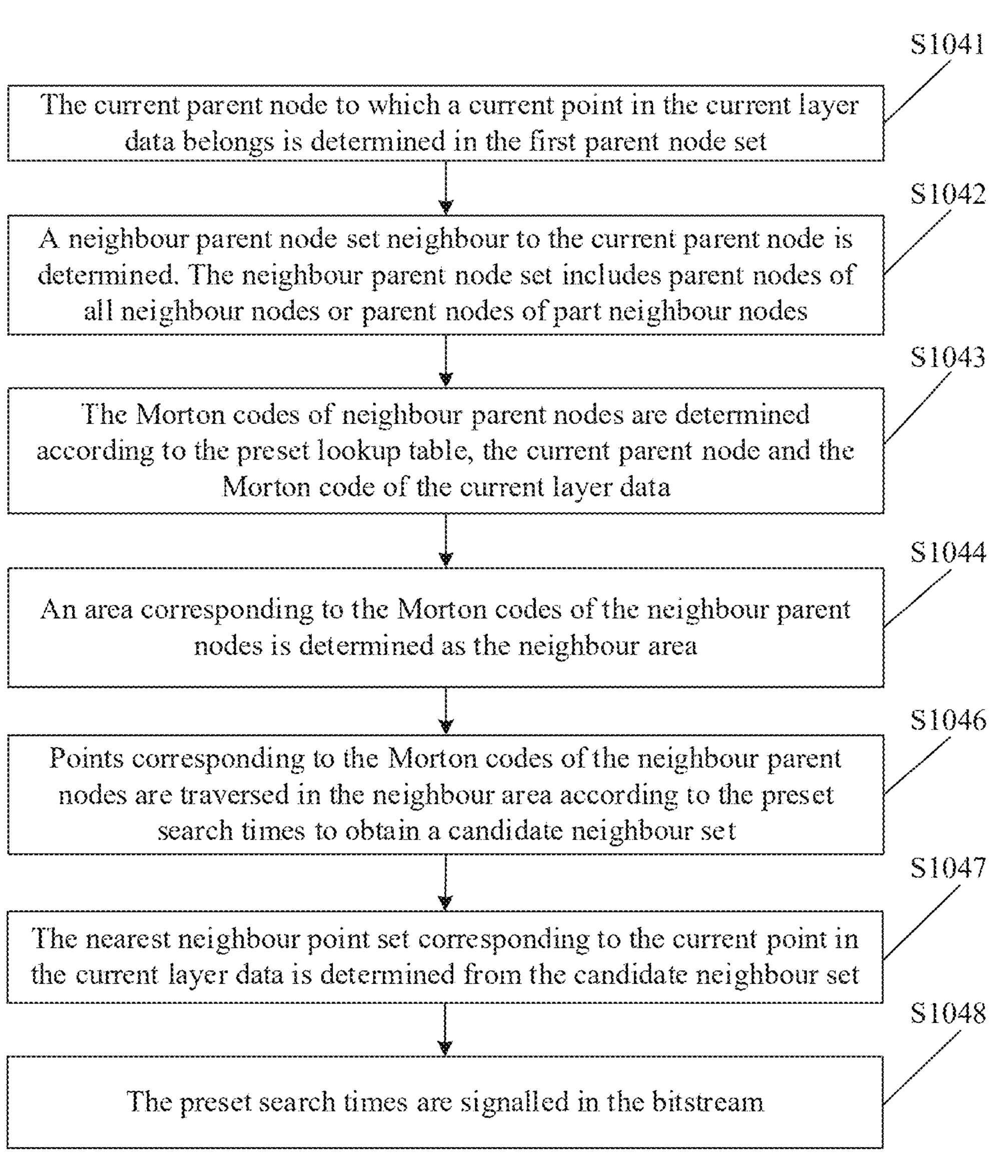
FIG. 3C is a schematic flowchart of a method for determining a nearest neighbour point set of the current layer data performed in encoder side, provided by an exemplary embodiment of the present disclosure.

FIG. 3B is a schematic flowchart of a method for determining a nearest neighbour point set of the current layer data performed in decoder side, provided by an exemplary embodiment of the present disclosure. FIG. 3C is a schematic flowchart of a method for determining a nearest neighbour point set of the current layer data performed in encoder side, provided by an exemplary embodiment of the present disclosure. In some embodiments of the present disclosure, the implementation of operation S104 may include operations S1041-S1047 performed by the decoder, as shown in FIG. 3B; or S1041-S1044, S1046-S1048 performed by the encoder, as shown in FIG. 3C. The specific operations are as follows.

In operation S1041, the current parent node to which a current point in the current layer data belongs is determined in the first parent node set.

In operation S1042, a neighbour parent node set neighbour to the current parent node is determined. The neighbour parent node set includes parent nodes of all neighbour nodes or parent nodes of part neighbour nodes.

In operation S1043, the Morton codes of neighbour parent nodes are determined according to the preset lookup table, the current parent node and the Morton code of the current layer data.

In operation S1044, an area corresponding to the Morton codes of the neighbour parent nodes is determined as the neighbour area.

In the embodiments of the present disclosure, the current layer data includes a plurality of current points. Here, the parent node to which each current point in the current layer data belongs is determined in the first parent node set, and the neighbour parent node set neighbour to the current parent node is determined.

It should be noted that, in the embodiments of the present disclosure, there are a plurality of neighbour parent nodes of a parent node corresponding to a current point, which is not limited in the embodiments of the present disclosure.

In the embodiments of the present disclosure, the neighbour parent node set may include the parent nodes of all neighbour nodes corresponding to the parent node of the current point, or may include the parent nodes of part neighbour nodes corresponding to the parent node of the current point, which is not limited in the embodiments of the present disclosure.

Exemplarily, as shown in FIG. 5, block 701 is the parent node of the currently predicted point P. For the current parent node, there are 26 adjacent neighbour parent nodes. In addition to the 27 neighbour parent nodes that are itself, coplanar, colinear, and co-pointed, the range of neighbour parent nodes may be expanded or reduced. In this way, the number of neighbours may be expanded outward.

In the embodiments of the present disclosure, a preset lookup table is set. The preset lookup table can indicate the corresponding relationship between the current parent node and the neighbour parent node set, and can be used to determine the Morton code of the neighbour parent node.

In some embodiments, a lookup table may be established through the following manners.

In the first manner, firstly, the difference value between the coordinate value of the neighbour parent node and the coordinate value of the current parent node is determined to obtain a difference value set.

For example, the difference value between the three-dimensional coordinates of each neighbour parent node and the three-dimensional coordinates of the current parent node is determined to obtain a difference value set.

Then, a lookup table is established according to the difference value set and the correspondence relationship between the neighbour parent node set and the current parent node set.

Here, the correspondence relationship is used to indicate that the neighbour parent node set is neighbour to the current parent node. Because each difference value corresponds to a neighbour parent node, and each neighbour parent node has its own current parent node, the lookup table can be established, and the three-dimensional coordinates of the neighbour parent node can be determined based on the difference value in the lookup table and the known three-dimensional coordinates of the current parent node, so as to obtain the Morton code of each neighbour parent node.

In the second manner, a lookup table is established according to the correspondence relationship, and the distance value from the center point in the neighbour parent node set to the center of the current parent node.

In some possible implementations, the weight value of neighbour node can be modified to a specific value, and the complexity of the algorithm may be reduced by using a lookup table method. For example, the weight value of each neighbour point is set to the distance value from the center point of the neighbours parent node to the current point. The distance value is taken as the weight value and combined with the correspondence relationship to establish a lookup table, so that the three-dimensional coordinates of the neighbour parent node may be obtained based on the distance value in the lookup table and the coordinate value of the current parent node, and then the Morton code of the neighbour parent node may be obtained.

In the third manner, firstly, the Hamming distance and the Morton code difference value between the neighbour parent node and the current parent node are determined according to the Morton code of the neighbour parent node and the Morton code of the current parent node. Then, a lookup table is established according to the Hamming distance, Morton code difference value and the correspondence relationship. In this way, after the lookup table is established, the Morton code of the neighbour parent node may be obtained based on the lookup table and the known coordinate values of the current parent node.

In the embodiments of the present disclosure, the Morton code of the neighbour parent node is determined according to the preset lookup table, the current parent node and the Morton code of the current layer data, and the area corresponding to the Morton codes of the neighbour parent nodes is determined as the neighbour area.

It should be noted that the area occupied by the Morton codes of the neighbour parent nodes is determined as the neighbour area. For example, firstly, in the second set, the sequence numbers of the Morton codes of the neighbour parent nodes are determined. Then, the area corresponding to the Morton codes of the neighbour parent nodes is determined according to the sequence numbers. Finally, at least part of the area occupied by the Morton codes of the neighbour parent nodes is taken as the neighbour area. For example, the entire area occupied by the Morton codes of the neighbour parent nodes is taken as the neighbour area, or a part of the area occupied by the Morton codes of the neighbour parent nodes is taken as the neighbour area. In this way, after obtaining the neighbour area, the order of searching for the nearest neighbour point of points may be the order of itself, coplanar, colinear and co-pointed. For a plurality of neighbour points existing in this area, the selection is made according to the distribution of spatial positions, and three neighbour points with uniform spatial distribution may be selected to avoid the situation that three neighbour points are on the same side of the predicted point, so that the searched nearest neighbour point set is more accurate.

In operation S1045, the bitstream is parsed to obtain preset search times.

When implemented in the decoder, the decoder firstly needs to parse the preset search times used by the encoder during encoding from the bitstream. The preset search times is used again in subsequent processing. This process is not existed for the encoder.

In operation S1046, points corresponding to the Morton codes of the neighbour parent nodes are traversed in the neighbour area according to the preset search times to obtain a candidate neighbour set.

In operation S1047, the nearest neighbour point set corresponding to the current point in the current layer data is determined from the candidate neighbour set.

In the embodiments of the present disclosure, the points corresponding to the Morton codes of the neighbour parent nodes are traversed in the neighbour area according to the preset search times to obtain the candidate neighbour set, that is, a candidate point set, and then the K nearest neighbour points nearest to the current point, i.e., the nearest neighbour point set, are found from the candidate neighbour set. K is a positive integer greater than 0.

In operation S1048, the preset search times are signalled in the bitstream.

In the embodiments of the present disclosure, in the process of determining the nearest neighbour point corresponding to the current point, the encoder needs to signal the adopted preset search times in the bitstream for the decoder to use in decoding.

It should be noted that, in the embodiments of the present disclosure, the preset search times are the upper limit value of the candidate points. When the K nearest neighbour points are not found beyond the preset search times, the manner of operation S105 will be used to perform the process of K nearest neighbour points.

In the embodiments of the present disclosure, the preset search times may be represented as LiftingNeighborSearchTimes.

Exemplarily, for the current parent node, there are 26 adjacent neighbour parent nodes. A lookup table is established by the coordinate difference value between the neighbour parent node and the current parent node, and the Morton code of the neighbour parent node is calculated and obtained according to the lookup table. The indexes corresponding to the Morton code of the current parent node and the Morton codes of these 26 neighbours or part of them may be found in O(k) based on the above Morton code. The points corresponding to these indexes are traversed as candidate points, and the K nearest neighbour points of the predicted point P (the current point) are found in the candidate points.

In some embodiments of the present disclosure, the method for determining the nearest neighbour is to find the K prediction points with the minimum distance by calculating the distance between the prediction point and the predicted point. The K prediction points are used as the neighbours of the predicted point, that is, the nearest neighbour points. Meanwhile, the distance between the nearest neighbour point and the predicted point is taken as the weight value between the predicted point and the prediction point.

Figure 6:
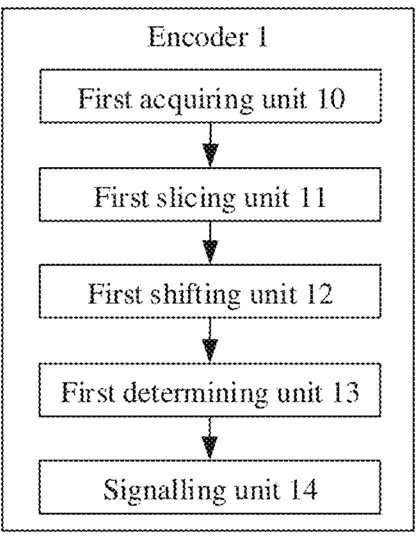
FIG. 6 is a schematic diagram of the composition structure of an encoder provided by an exemplary embodiment of the present disclosure.

FIG. 6 is a schematic diagram of the composition structure of an encoder provided by an exemplary embodiment of the present disclosure. As shown in FIG. 6, the encoder 1 includes a first acquiring unit 10, a first slicing unit 11, a first shifting unit 12, and a first determining unit 13.

The first acquiring unit 10 is configured to acquire a Morton code set of point cloud data to be searched.

The first slicing unit 11 is configured to perform slicing on the point cloud data according to the Morton code set and a first distance threshold to obtain current layer data.

The first shifting unit 12 is configured to shift Morton code bits of prediction data corresponding to the current layer data in the point cloud data to right by a first preset number of bits to obtain a corresponding first parent node set.

The first determining unit 13 is configured to determine, according to a Morton code of the current layer data, a neighbour area in the first parent node set, determine a nearest neighbour point set of the current layer data in the neighbour area, and in response to the neighbour area being not determined, determine a search point of the current layer data according to a second node set, and perform search in a first preset search range corresponding to the search point to determine the nearest neighbour point set. The second node set is a prediction data set corresponding to the current layer data in the point cloud data.

In some embodiments of the present disclosure, the first determining unit 13 is further configured to determine, in the first parent node set, a current parent node to which a current point in the current layer data belongs, determine a neighbour parent node set neighbour to the current parent node, determine Morton codes of neighbour parent nodes according to a preset lookup table, the current parent node and the Morton code of the current layer data, and determine an area corresponding to the Morton codes of the neighbour parent nodes as the neighbour area.

In some embodiments of the present disclosure, the encoder 1 further includes a signalling unit 14.

The first determining unit 13 is further configured to traverse, in the neighbour area, points corresponding to the Morton codes of the neighbour parent nodes according to preset search times to obtain a candidate neighbour set, determine, from the candidate neighbour set, the nearest neighbour point set corresponding to the current point in the current layer data.

The signalling unit 14 is configured to signal the preset search times in a bitstream.

In some embodiments of the present disclosure, the first determining unit 13 is further configured to determine, from the second node set, a first Morton code greater than a current Morton code of a current point of the current layer data, and set a point corresponding to the first Morton code as the search point.

In some embodiments of the present disclosure, the first slicing unit 11 is further configured to determine, according to the Morton code set, a second set at least including a point corresponding to a first Morton code, in response to a distance between a currently processed current point in the point cloud data and a point in the second set being less than or equal to the first distance threshold, place the current point into a first set, in response to the distance between the current point and the point in the second set being greater than the first distance threshold, place the current point into the second set, and determine a point in the second set whose distance from the current point being less than or equal to a second distance threshold to obtain the current layer data. The first distance threshold is less than the second distance threshold.

In some embodiments of the present disclosure, the first preset number of bits is a preset non-negative integer.

In some embodiments of the present disclosure, the first acquiring unit 10 is further configured to sample the Morton code set according to a preset interval to obtain a sample set, wherein the Morton code set comprises all or part of Morton codes of the prediction data, shift Morton code bits of points in the sample set to the right by n bits to obtain a sample parent node set, determine neighbour points other than samples in an area corresponding to the sample parent node set, and in response to an average number of neighbour points in the sample parent node set being greater than a preset average threshold, determine that the n bits are a value of the first preset number of bits. n is a non-negative integer.

In some embodiments of the present disclosure, the first acquiring unit 10 is further configured to: acquire the point cloud data to be searched, determine Morton codes of the point cloud data, and arrange the Morton codes of the point cloud data in ascending order to obtain the Morton code set including a plurality of Morton codes.

In some embodiments of the present disclosure, the signalling unit 14 is further configured to signal the first preset number of bits in a bitstream.

In some embodiments of the present disclosure, the signalling unit 14 is further configured to signal the first preset number of bits in a parameter set data unit in the bitstream.

In some embodiments of the present disclosure, the parameter set data unit is a Sequence Parameter Set data unit.

In some embodiments of the present disclosure, the parameter set data unit includes attribute information of the point cloud data. The attribute information is scalar or vector attribute information associated with points in the point cloud data.

In some embodiments of the present disclosure, the parameter set data unit includes geometry information of the point cloud data. The geometry information is Cartesian coordinates associated with points in the point cloud data.

In some embodiments of the present disclosure, the neighbour parent node set includes parent nodes of all neighbour nodes or parent nodes of part neighbour nodes.

Figure 7:
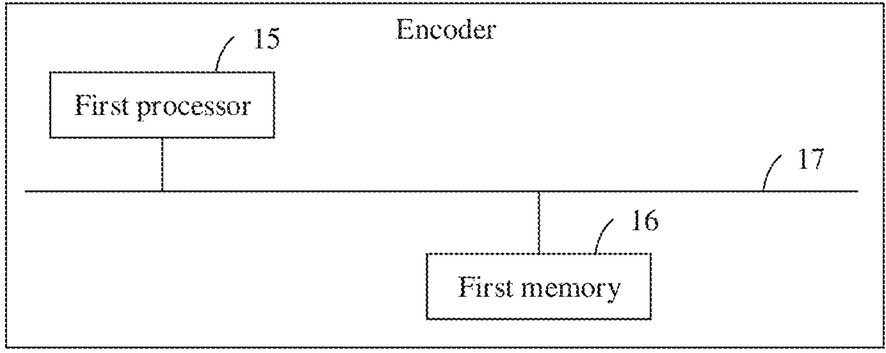
FIG. 7 is a schematic diagram of specific hardware structures of an encoder provided by an exemplary embodiment of the present disclosure.

In practical application, as shown in FIG. 7, a schematic diagram of the hardware entity of the encoder is shown according to an exemplary embodiment of the present disclosure. The encoder includes a first processor 15 and a first memory 16 storing the computer program executable by the first processor 15.

The first memory 16 relies on the first processor 15 to perform operations through a first communication bus 17. When the computer program is executed by the first processor 15, the above-mentioned nearest neighbour search method on the encoder side is executed.

It should be understood that, in this embodiment, a "unit" may be a part of a circuit, a part of a processor, a part of a program or software, etc., of course, it may also be a module, and it may also be non-modular. Moreover, each component in this embodiment may be integrated into one processing unit, or each unit may exist physically alone, or two or more units may be integrated into one unit. The above-mentioned integrated units may be implemented in the form of hardware, or may be implemented in the form of software function modules.

If the integrated unit is implemented in the form of a software function module and is not sold or used as an independent product, it can be stored in a computer-readable storage medium. Based on this understanding, the essence of the technical solution of this embodiment, or the part that contributes to the existing technology, or all or part of the technical solution may be embodied in the form of software products. The computer software product is stored in a storage medium and includes several instructions for causing a computer device (which may be a personal computer, a server, or a network device, etc.) or a processor to execute all or part of the steps of the method described in the embodiments. The aforementioned storage medium includes: U disk, removable hard disk, Read Only Memory (ROM), Random Access Memory (RAM), magnetic disk or optical disk and other media that can store program codes.

Figure 8:
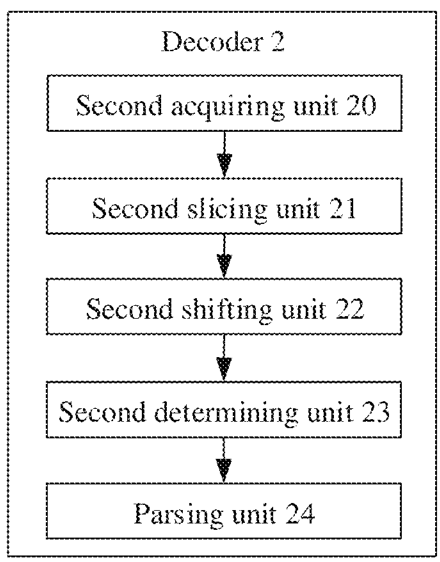
FIG. 8 is a schematic diagram of the composition structure of a decoder provided by an exemplary embodiment of the present disclosure.

FIG. 8 is a schematic diagram of the composition structure of a decoder provided by an exemplary embodiment of the present disclosure. As shown in FIG. 8, the decoder 2 includes a second acquiring unit 20, a second slicing unit 21, a second shifting unit 22, and second determining unit 23.

The second acquiring unit 20 is configured to acquire a Morton code set of point cloud data to be searched.

The second slicing unit 21 is configured to perform slicing on the point cloud data according to the Morton code set and a first distance threshold to obtain current layer data.

The second shifting unit 22 is configured to shift Morton code bits of prediction data corresponding to the current layer data in the point cloud data to right by a first preset number of bits to obtain a corresponding first parent node set.

The second determining unit 23 is configured to determine, according to a Morton code of the current layer data, a neighbour area in the first parent node set, determine a nearest neighbour point set of the current layer data in the neighbour area, in response to the neighbour area being not determined, determine a search point of the current layer data according to a second node set, and perform search in a first preset search range corresponding to the search point to determine the nearest neighbour point set. The second node set is a prediction data set corresponding to the current layer data in the point cloud data.

In some embodiments of the present disclosure, the second determining unit 23 is further configured to determine, in the first parent node set, a current parent node to which a current point in the current layer data belongs, determine a neighbour parent node set neighbour to the current parent node, determine Morton codes of neighbour parent nodes according to a preset lookup table, the current parent node and the Morton code of the current layer data, and determine an area corresponding to the Morton codes of the neighbour parent nodes as the neighbour area.

In some embodiments of the present disclosure, the decoder 2 further includes: a parsing unit 24.

The parsing unit 24 is configured to parse a bitstream to obtain a preset search times.

The second determining unit 23 is further configured to traverse, in the neighbour area, points corresponding to the Morton codes of the neighbour parent nodes according to preset search times to obtain a candidate neighbour set, and determine, from the candidate neighbour set, the nearest neighbour point set corresponding to the current point in the current layer data.

In some embodiments of the present disclosure, the second determining unit 23 is further configured to determine, from the second node set, a first Morton code greater than a current Morton code of a current point of the current layer data, and set a point corresponding to the first Morton code as the search point.

In some embodiments of the present disclosure, the second slicing unit 21 is further configured to determine, according to the Morton code set, a second set at least including a point corresponding to a first Morton code, in response to a distance between a currently processed current point in the point cloud data and a point in the second set being less than or equal to the first distance threshold, place the current point into a first set, in response to the distance between the current point and the point in the second set being greater than the first distance threshold, place the current point into the second set, determine a point in the second set whose distance from the current point being less than or equal to a second distance threshold to obtain the current layer data. The first distance threshold is less than the second distance threshold.

In some embodiments of the present disclosure, the parsing unit 24 is further configured to parse a bitstream to obtain the first preset number of bits. The first preset number of bits is a non-negative integer.

The second shifting unit 22 is further configured to shift the Morton code of the prediction data corresponding to the current layer data in the point cloud data to right by the first preset number bits to obtain the corresponding first parent node set.

In some embodiments of the present disclosure, the second acquiring unit 20 is further configured to sample the Morton code set according to a preset interval to obtain a sample set, wherein the Morton code set comprises all or part of Morton codes of the prediction data, shift Morton code bits of points in the sample set to the right by n-bit to obtain a sample parent node set, determine neighbour points other than samples in an area corresponding to the sample parent node set, and in response to an average number of neighbour points in the sample parent node set being greater than a preset average threshold, determine that a value of the n-bit is a value of the first preset number of bits. n is a non-negative integer.

In some embodiments of the present disclosure, the second acquiring unit 20 is further configured to acquire the point cloud data to be searched, determine Morton codes of the point cloud data, and arrange the Morton codes of the point cloud data in ascending order to obtain the Morton code set including a plurality of Morton codes.

In some embodiments of the present disclosure, the parsing unit 24 is further configured to parse a parameter set data unit in the bitstream to obtain the first preset number of bits.

In some embodiments of the present disclosure, the parameter set data unit is a Sequence Parameter Set data unit.

In some embodiments of the present disclosure, the parameter set data unit includes attribute information of the point cloud data. The attribute information is scalar or vector attribute information associated with points in the point cloud data.

In some embodiments of the present disclosure, the parameter set data unit includes geometry information of the point cloud data. The geometry information is Cartesian coordinates associated with points in the point cloud data.

In some embodiments of the present disclosure, the neighbour parent node set includes parent nodes of all neighbour nodes or parent nodes of part neighbour nodes.

Figure 9:
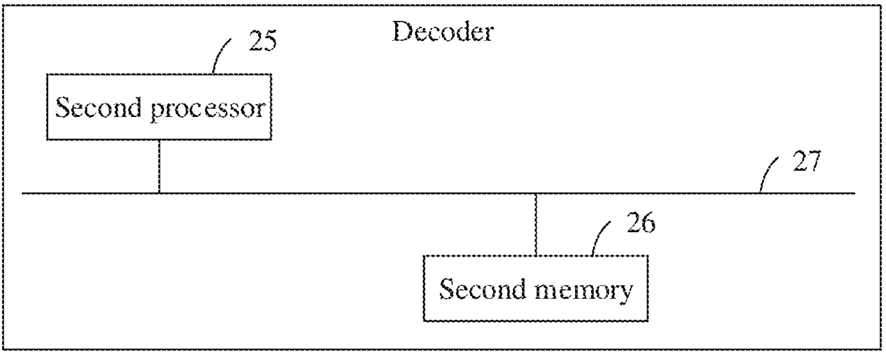
FIG. 9 is a schematic diagram of specific hardware structures of a decoder provided by an exemplary embodiment of the present disclosure.

In practical application, as shown in FIG. 9, a schematic diagram of a hardware entity of a decoder is shown according to an exemplary embodiment of the present disclosure. The decoder includes a second processor 25 and the second memory 26 storing the computer program executable by the second processor 25.

The second memory 26 relies on the second processor 25 to perform operations through the second communication bus 27. When the computer program is executed by the second processor 25, the above-mentioned nearest neighbour search method on the decoder side is executed.

A processor may be an integrated circuit chip with signal processing capabilities. In the implementation process, each step of the above-mentioned method may be completed by a hardware integrated logic circuit in a processor or an instruction in the form of software. The above-mentioned processor may be a general purpose processor, a Digital Signal Processor (DSP), an Application Specific Integrated Circuit (ASIC), an Field Programmable Gate Array (FPGA) or other available programming logic devices, discrete gate or transistor logic devices, discrete hardware components. The methods, steps, and logic block diagrams disclosed in the embodiments of the present disclosure may be implemented or executed. A general purpose processor may be a microprocessor or the processor may be any conventional processor or the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, Read Only Memory, Programmable Read Only Memory or electrically erasable programmable memory, registers and other storage media mature in the art. The storage medium is located in the memory, and the processor reads the information in the first memory. The steps of the above method are completed in combination with its hardware.

The embodiments of the present disclosure provide a computer-readable storage medium. A computer program is stored in the computer storage medium, and when the computer program is executed by the first processor, the nearest neighbour search method described on the encoder side is implemented, or when the computer program is executed by the second processor, the nearest neighbour search method described on the decoder side is implemented.

It should be noted that, in the present disclosure, the terms "comprising", "including" or any other variation thereof are intended to encompass non-exclusive inclusion, such that a process, method, object or device including a series of elements includes not only those elements, but also other elements not expressly listed or inherent to such a process, method, object or device. Without further limitation, an element limited by the phrase "comprising a . . . " does not preclude the presence of additional identical elements in a process, method, object or device that includes the elements.

The above-mentioned serial numbers of the embodiments of the present disclosure are only for description, and do not represent the advantages or disadvantages of the embodiments.

The methods disclosed in the several method embodiments provided in the present disclosure can be combined arbitrarily under the condition of no conflict to obtain new method embodiments.

The features disclosed in the several product embodiments provided in the present disclosure can be combined arbitrarily under the condition of no conflict to obtain new product embodiments.

The features disclosed in several method or device embodiments provided in the present disclosure can be combined arbitrarily under the condition of no conflict to obtain new method or device embodiments.

The above descriptions are only preferred embodiments of the present disclosure, and are not intended to limit the protection scope of the present disclosure.

INDUSTRIAL APPLICABILITY

The embodiments of the present disclosure disclose a nearest neighbour search method, an encoder, a decoder and a storage medium. The method includes the following operations. A Morton code set of point cloud data to be searched is acquired. Slicing is performed on the point cloud data according to the Morton code set and a first distance threshold to obtain current layer data. Morton code bits of prediction data corresponding to the current layer data in the point cloud data are shifted to right by a first preset number of bits to obtain a corresponding first parent node set. A neighbour area in the first parent node set is determined according to a Morton code of the current layer data. A nearest neighbour point set of the current layer data is determined in the neighbour area. In response to the neighbour area being not determined, a search point of the current layer data is determined according to a second node set. Search is performed in a first preset search range corresponding to the search point to determine the nearest neighbour point set. The second node set is a prediction data set corresponding to the current layer data in the point cloud data. In this way, the neighbour area is searched through the Morton code of the current layer data, the range for searching the nearest neighbour point is narrowed under the premise that the neighbour area can be accurately found, and when the neighbour area is not searched through the Morton code of the current layer data, the neighbour area can be searched based on the second set, which improves the success rate of the search.

The invention claimed is:

1. A nearest neighbour search method, applied to an encoder, comprising:

acquiring position information of point cloud data to be searched;

performing slicing on the point cloud data according to the position information of point cloud data to be searched and a first distance threshold to obtain current layer data;

obtaining corresponding first parent nodes according to the current layer data in the point cloud data and a first preset number of bits, wherein bits indicating position information of prediction data corresponding to the current layer data in the point cloud data are shifted right by the first preset number of bits;

determining, according to position information of the current layer data, a neighbour area in the first parent nodes;

when the neighbour area is determined, determining a nearest neighbour point of the current layer data in the neighbour area; and when the neighbour area is not determined, determining a search point of the current layer data according to a second node, and performing search in a first preset search range corresponding to the search point to determine the nearest neighbour point, wherein the second node is prediction data corresponding to the current layer data in the point cloud data, wherein determining, according to the position information of the current layer data, the neighbour area in the first parent nodes comprises:

determining, in the first parent nodes, a current parent node to which a current point in the current layer data belongs;

determining a neighbour parent node neighbour to the current parent node;

determining position information of neighbour parent nodes according to a preset lookup table, the current parent node and the position information of the current layer data; and determining an area corresponding to the position information of the neighbour parent nodes as the neighbour area, wherein determining the nearest neighbour point of the current layer data in the neighbour area comprises:

traversing, in the neighbour area, points corresponding to the position information of the neighbour parent nodes according to preset search times to obtain a candidate neighbour;

determining, from the candidate neighbour, the nearest neighbour point corresponding to the current point in the current layer data; and signalling the preset search times in a bitstream, wherein obtaining corresponding first parent nodes according to the current layer data in the point cloud data and a first preset number of bits comprising:

sampling the position information of point cloud data to be searched according to a preset interval to obtain an sample, wherein the position information of point cloud data to be searched comprises all or part of position information of the prediction data;

shifting position information bits of the sample to the right by n bits to obtain an sample parent node;

determining neighbour points other than samples in an area corresponding to the sample parent node; and in response to an average number of neighbour points in the sample parent node being greater than a preset average threshold, determining that the n bits are a value of the first preset number of bits, wherein n is a non-negative integer.

2. The method of claim 1, wherein performing slicing on the point cloud data according to the position information of point cloud data to be searched and the first distance threshold to obtain current layer data comprising:

determining, according to the position information of point cloud data to be searched, a corresponding point; and determining a point in the corresponding point whose distance from a currently processed current point in the point cloud data being greater than the first distance threshold and less than or equal to a second distance threshold to obtain the current layer data, wherein the first distance threshold is less than the second distance threshold.

3. The method of claim 1, further comprising:

signalling the first preset number of bits in the bitstream.

4. A nearest neighbour search method, applied to a decoder, comprising:

acquiring position information of point cloud data to be searched;

performing slicing on the point cloud data according to the position information of point cloud data to be searched and a first distance threshold to obtain current layer data;

obtaining corresponding first parent nodes according to the current layer data in the point cloud data and a first preset number of bits, wherein bits indicating position information of prediction data corresponding to the current layer data in the point cloud data are shifted right by the first preset number of bits;

determining, according to position information of the current layer data, a neighbour area in the first parent nodes;

when the neighbour area is determined, determining a nearest neighbour point of the current layer data in the neighbour area; and when the neighbour area is not determined, determining a search point of the current layer data according to a second node, and performing search in a first preset search range corresponding to the search point to determine the nearest neighbour point, wherein the second node is prediction data corresponding to the current layer data in the point cloud data, wherein determining, according to the position information of the current layer data, the neighbour area in the first parent nodes comprises:

determining, in the first parent nodes, a current parent node to which a current point in the current layer data belongs;

determining a neighbour parent node neighbour to the current parent node;

determining position information of neighbour parent nodes according to a preset lookup table, the current parent node and the position information of the current layer data; and determining an area corresponding to the position information of the neighbour parent nodes as the neighbour area, wherein determining the nearest neighbour point of the current layer data in the neighbour area comprises:

parsing a bitstream to obtain preset search times;

traversing, in the neighbour area, points corresponding to the position information of the neighbour parent nodes according to the preset search times to obtain a candidate neighbour; and determining, from the candidate neighbour, the nearest neighbour point corresponding to the current point in the current layer data, wherein obtaining corresponding first parent nodes according to the current layer data in the point cloud data and a first preset number of bits comprising:

sampling the position information of point cloud data to be searched according to a preset interval to obtain an sample, wherein the position information of point cloud data to be searched comprises all or part of position information of the prediction data;

shifting position information bits of points in the sample to the right by n-bit to obtain a sample parent node;

determining neighbour points other than samples in an area corresponding to the sample parent node; and in response to an average number of neighbour points in the sample parent node being greater than a preset average threshold, determining that a value of the n-bit is a value of the first preset number of bits, wherein n is a non-negative integer.

5. The method of claim 4, wherein performing slicing on the point cloud data according to the position information of point cloud data to be searched and the first distance threshold to obtain current layer data comprising:

determining, according to the position information of point cloud data to be searched, a corresponding point; and determining a point in the corresponding point whose distance from a currently processed current point in the point cloud data being greater than the first distance threshold and less than or equal to a second distance threshold to obtain the current layer data, wherein the first distance threshold is less than the second distance threshold.

6. The method of claim 4, wherein obtaining corresponding first parent nodes according to the current layer data in the point cloud data and a first preset number of bits comprises:

parsing the bitstream to obtain the first preset number of bits; and shifting the position information of the prediction data corresponding to the current layer data in the point cloud data to right by the first preset number bits to obtain the corresponding first parent nodes.

7. An encoder comprising a memory and a processor, wherein, the memory is configured to store a computer program executable on the processor; and the processor is configured to:

acquire position information of point cloud data to be searched;

perform slicing on the point cloud data according to the position information of point cloud data to be searched and a first distance threshold to obtain current layer data;

obtain corresponding first parent nodes according to the current layer data in the point cloud data and a first preset number of bits, wherein bits indicating position information of prediction data corresponding to the current layer data in the point cloud data are shifted right by the first preset number of bits;

determine, according to position information of the current layer data, a neighbour area in the first parent nodes, determine a nearest neighbour point of the current layer data in the neighbour area when the neighbour area is determined, and when the neighbour area is not determined, determine a search point of the current layer data according to a second node, and perform search in a first preset search range corresponding to the search point to determine the nearest neighbour point, wherein the second node is prediction data corresponding to the current layer data in the point cloud data, wherein the processor is further configured to:

determine, in the first parent nodes, a current parent node to which a current point in the current layer data belongs;

determine a neighbour parent node neighbour to the current parent node;

determine position information of neighbour parent nodes according to a preset lookup table, the current parent node and the position information of the current layer data; and determine an area corresponding to the position information of the neighbour parent nodes as the neighbour area, and wherein the processor is further configured to:

traverse, in the neighbour area, points corresponding to the position information of the neighbour parent nodes according to preset search times to obtain a candidate neighbour;

determine, from the candidate neighbour, the nearest neighbour point corresponding to the current point in the current layer data; and signal the preset search times in a bitstream, wherein the processor is further configured to:

sample the position information of point cloud data to be searched according to a preset interval to obtain an sample, wherein the position information of point cloud data to be searched comprises all or part of position information of the prediction data;

shift position information bits of the sample to the right by n bits to obtain an sample parent node;

determine neighbour points other than samples in an area corresponding to the sample parent node; and in response to an average number of neighbour points in the sample parent node being greater than a preset average threshold, determine that the n bits are a value of the first preset number of bits, wherein n is a non-negative integer.

8. A decoder comprising a memory and a processor, wherein, the memory is configured to store a computer program executable on the processor; and the processor is configured to:

acquire position information of point cloud data to be searched;

performing slicing on the point cloud data according to the position information of point cloud data to be searched and a first distance threshold to obtain current layer data;

obtain corresponding first parent nodes according to the current layer data in the point cloud data and a first preset number of bits, wherein bits indicating position information of prediction data corresponding to the current layer data in the point cloud data are shifted right by the first preset number of bits;

determine, according to position information of the current layer data, a neighbour area in the first parent nodes, determine a nearest neighbour point of the current layer data in the neighbour area when the neighbour area is determined, and when the neighbour area is not determined, determine a search point of the current layer data according to a second node, and perform search in a first preset search range corresponding to the search point to determine the nearest neighbour point, wherein the second node is prediction data corresponding to the current layer data in the point cloud data, wherein the processor is further configured to:

determine, in the first parent nodes, a current parent node to which a current point in the current layer data belongs;

determine a neighbour parent node neighbour to the current parent node;

determine position information of neighbour parent nodes according to a preset lookup table, the current parent node and the position information of the current layer data; and determine an area corresponding to the position information of the neighbour parent nodes as the neighbour area, wherein the processor is further configured to:

parse a bitstream to obtain preset search times;

traverse, in the neighbour area, points corresponding to the position information of the neighbour parent nodes according to the preset search times to obtain a candidate neighbour; and determine, from the candidate neighbour, the nearest neighbour point corresponding to the current point in the current layer data, wherein the processor is further configured to:

sample the position information of point cloud data to be searched according to a preset interval to obtain an sample, wherein the position information of point cloud data to be searched comprises all or part of position information of the prediction data;

shift position information bits of points in the sample to the right by n-bit to obtain a sample parent node;

determine neighbour points other than samples in an area corresponding to the sample parent node; and in response to an average number of neighbour points in the sample parent node being greater than a preset average threshold, determine that a value of the n-bit is a value of the first preset number of bits, wherein n is a non-negative integer.

* * * * *